United States Patent
Yang et al.

(10) Patent No.: US 8,179,250 B2
(45) Date of Patent: *May 15, 2012

(54) POWER MANAGEMENT INTERFACE

(75) Inventors: Ta-Yung Yang, Milpitas, CA (US);
Yi-Chi Lin, Taichung (TW);
Yung-Sheng Wu, Taipei County (TW);
Wen-Chang Lu, Taoyuan County (TW);
Shih-Jen Yang, Taipei County (TW)

(73) Assignee: System General Corporation, Sindian, Taipei County (TW)

( * ) Notice: Subject to any disclaimer, the term of this patent is extended or adjusted under 35 U.S.C. 154(b) by 434 days.

This patent is subject to a terminal disclaimer.

(21) Appl. No.: 12/501,509

(22) Filed: Jul. 13, 2009

(65) Prior Publication Data
US 2010/0123563 A1    May 20, 2010

Related U.S. Application Data

(60) Provisional application No. 61/199,835, filed on Nov. 19, 2008.

(51) Int. Cl.
*G08B 1/08* (2006.01)

(52) U.S. Cl. ............ 340/538; 340/538.11; 340/12.32; 340/12.33; 307/126

(58) Field of Classification Search .......... 340/538, 340/310.01–310.05, 310.12, 12.32, 12.33, 340/13.23, 538.11; 361/94, 98, 105; 323/325; 307/126; 700/286, 292
See application file for complete search history.

(56) References Cited

U.S. PATENT DOCUMENTS

| | | | | |
|---|---|---|---|---|
| 5,929,749 A * | 7/1999 | Slonim et al. | ............ | 340/870.01 |
| 6,570,493 B1 * | 5/2003 | Rotem | ............ | 340/12.33 |
| 6,832,135 B2 * | 12/2004 | Ying | ............ | 700/295 |
| 7,660,365 B2 * | 2/2010 | Koga et al. | ............ | 375/295 |
| 2010/0145536 A1 * | 6/2010 | Masters et al. | ............ | 700/292 |

* cited by examiner

*Primary Examiner* — Toan N Pham
(74) *Attorney, Agent, or Firm* — Thomas|Kayden

(57) ABSTRACT

A power management interface is provided and includes a switch, a transmitting circuit, and a receiving circuit. The switch is coupled to an AC power line for controlling a power line signal to a load. The transmitting circuit generates a switching signal to control the switch and achieve a phase modulation to the power line signal in response to a transmitting-data. The receiving circuit is coupled to receive the power line signal for detecting a phase of the power line signal and generating a receiving-data to control power of the load. The receiving-data is generated in accordance with the phase detection of the power line signal and correlated to the transmitting-data.

9 Claims, 5 Drawing Sheets

POWER MANAGEMENT INTERFACE

CROSS REFERENCE TO RELATED APPLICATIONS

The present application claims the benefit of U.S. provisional application entitled "A Power Management Interface through AC Power Line", Ser. No. 61/199,835, filed Nov. 19, 2008.

BACKGROUND OF THE INVENTION

1. Field of the Invention

The invention relates to a power management interface, and more particularly to a power management interface using a digitized approach.

2. Description of the Related Art

FIG. 1 shows a conventional power management circuit for a load. Referring to FIG. 1, the power management circuit is coupled to an alternating current (AC) power line $V_{AC}$ through terminals L and N. The power management circuit comprises a tri-electrode AC (TRIAC) switch 90, a gate triggering circuit 92, and a load 95. The gate triggering circuit 92 generates a trigger signal to control turned-on and turned-off states of the TRIAC switch 90. By adjusting a resistance value of an RC circuit within the gate triggering circuit 92, the turning off time of the TRIAC switch 90 can be controlled by the trigger signal. Referring to FIG. 2, when the trigger signal turns on the TRIAC switch 90, the waveform of a power line signal $V_{TR}$ tracks the waveform of the voltage signal on the AC power line $V_{AC}$. When the trigger signal turns off the TRIAC switch 90, the voltage signal on the AC power line $V_{AC}$ can not be provided to the load 95, so that the power line signal $V_{TR}$ is switched to a zero level. Thus, when the trigger signal turns off the TRIAC switch 90, the power is not delivered to the load 92. According to the control to the state of the TRIAC switch 90, the power delivered to the load 92 is managed.

However, the drawback of the conventional power management circuit can not be applied for an electronic product whose front-end circuit comprises a bridge rectifier and a capacitor because of the rippling-wave effect of the capacitor. The conventional power management circuit of FIG. 1 is applied only for a resistance load. Further, because the power line signal $V_{TR}$ is switched from the zero level to the waveform of the voltage signal on the AC power line $V_{AC}$, the conventional power management circuit of FIG. 1 has the poor power factor and high current harmonic, resulting in large power transmission loss.

BRIEF SUMMARY OF THE INVENTION

An exemplary embodiment of a power management interface comprises a switch, a transmitting circuit, and a receiving circuit. The switch is coupled to an AC power line for controlling a power line signal to a load. The transmitting circuit generates a switching signal to control the switch and achieve a phase modulation to the power line signal in response to a transmitting-data. The receiving circuit is coupled to receive the power line signal for detecting a phase of the power line signal and generating a receiving-data to control power of the load. The receiving-data is generated in accordance with the phase detection of the power line signal and correlated to the transmitting-data.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
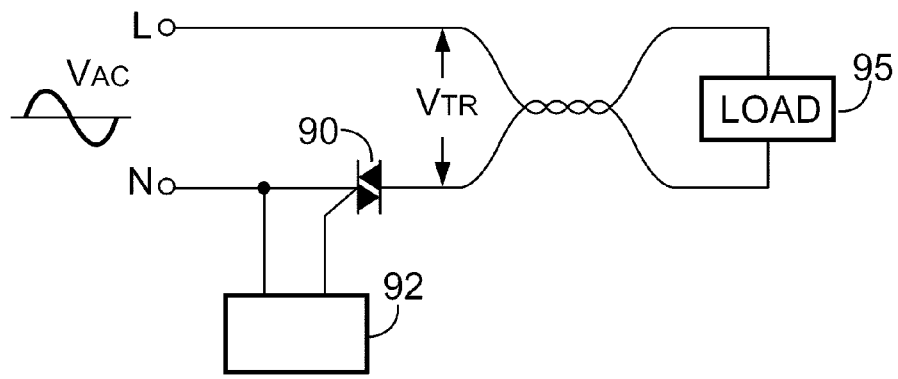
FIG. 1 shows a conventional power management circuit for a load.
Figure 2:
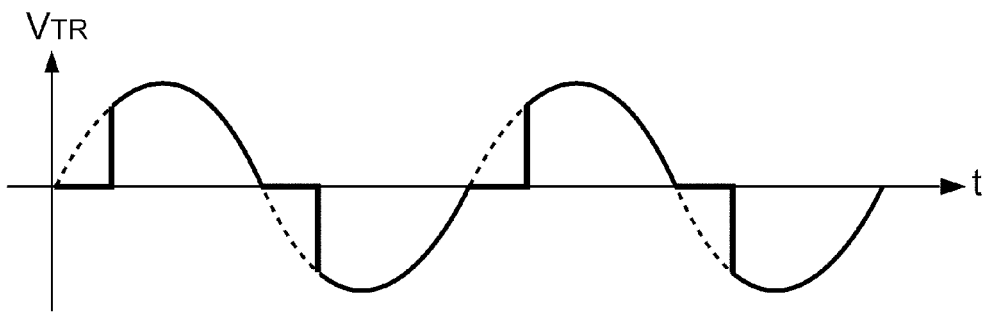
FIG. 2 shows the waveform of the power line signal $V_{TR}$ of FIG. 1.

The following description is of the best-contemplated mode of carrying out the invention. This description is made for the purpose of illustrating the general principles of the invention and should not be taken in a limiting sense. The scope of the invention is best determined by reference to the appended claims.

Power management interfaces are provided. In one embodiment of a power management interface in FIG. 3, a power management interface is coupled to an alternating current (AC) power line $V_{AC}$ through terminals L and N for controlling a power line signal $V_{LM}$ between the terminals L and M to a load 50. The power management interface comprises a switch 10, a diode 15, a transmitting circuit 20, and a receiving circuit 60. In the embodiment, the switch 10 can be implemented by a MOSFET or an IGBT. In normal condition, the switch 10 remains the turned-on state, and a loop through the diode 15 is formed. When the power of the load 50 is managed, the transmitting circuit 20 generates a switching signal $S_W$ to control the turned-on and turned-off states of the switch 10 and achieve a phase modulation to the power line signal $V_{LM}$ in accordance with a transmitting-data DATA-IN which is a digital sequence in the embodiment. The receiving circuit 60 is coupled to receive the power line signal $V_{LM}$ for detecting the phase of the power line signal $V_{LM}$ and generating a receiving-data DATA-OUT in accordance with the power line signal $V_{LM}$. In detail, the receiving-data DATA-OUT is generated in response to the detection of the phase of the power line signal $V_{LM}$ which is modulated in accordance with the transmitting-data DATA-IN. Thus, the receiving-data DATA-OUT is correlated to the logic level of the transmitting-data DATA-IN. The power of the load 50 is managed in accordance with the receiving-data DATA-OUT.

Figure 4:
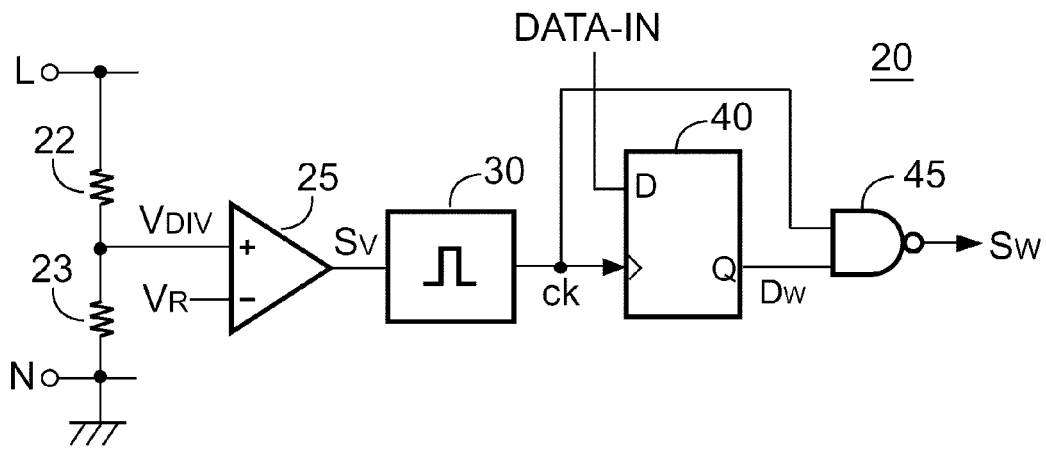
FIG. 4 shows an exemplary embodiment of the transmitting circuit in FIG. 3.
Figure 5:
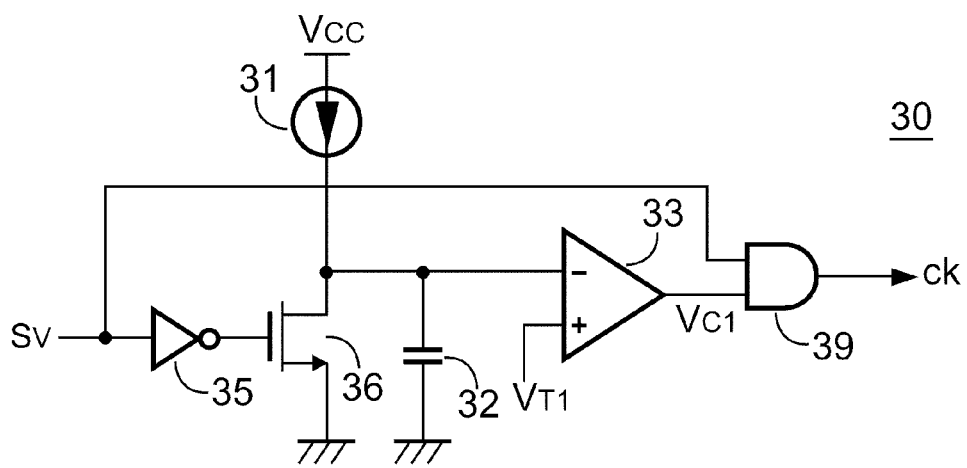
FIG. 5 shows an exemplary embodiment of the pulse generator in FIG. 4.
Figure 6:
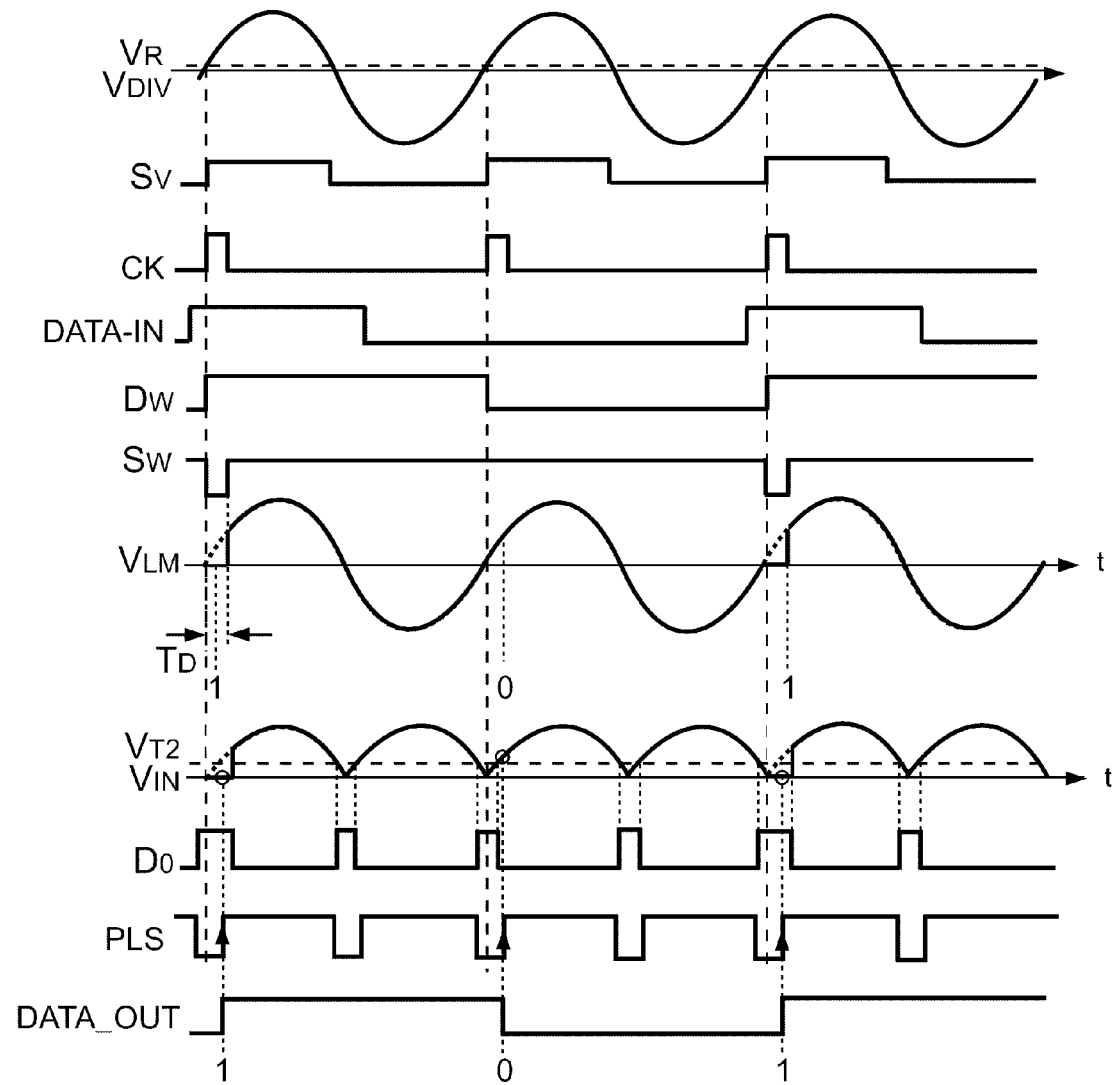
FIG. 6 shows the waveforms of the signals of the power management interface in FIG. 3.

FIG. 4 shows an embodiment of the transmitting circuit 20. Referring to FIG. 4, the transmitting circuit 20 comprises an input circuit, a register 40, and output circuit. The input circuit comprises a voltage divider developed by resistors 22 and 23, a comparator 25, and a pulse generator 30. The resistors 22 and 23 are coupled in series between the terminals L and N. A positive input terminal of the comparator 25 is coupled the connection node between the resistors 22 and 23, a negative input terminal thereof receives a reference signal $V_R$, and an output terminal thereof is coupled to the pulse generator 30. The voltage of the AC power line $V_{AC}$ is divided by the voltage divider, and an input signal $V_{DIV}$ is thus generated at the connection node between the resistors 22 and 23. One embodiment of the pulse generator 30 is shown in FIG. 5 and described later. Referring to FIGS. 4 and 6, the comparator 25 compares the input signal $V_{DIV}$ with the reference signal $V_R$ and generates a zero-crossing signal $S_V$ at the output terminal of the comparator 25 in accordance with the comparison result. The pulse generator 30 receives the zero-crossing signal $S_V$ and generates a clock signal CK in accordance with the zero-crossing signal $S_V$.

The register 40 is used to memorize the state of the transmitting-data DATA-IN. In the embodiment, the register 40 is implemented by a D flip-flop. The transmitting-data DATA-IN is a digital signal for managing the power of the load 50, and "101" is given as an example for the transmitting-data DATA-IN. Also referring to FIGS. 4 and 6, the D flip-flop 40 receives the transmitting-data DATA-IN and samples the transmitting-data DATA-IN in accordance with raising edge of the clock signal CK to generate a state signal $D_W$. The output circuit is implemented by an NAND gate 45 in the embodiment. The NAND gate 45 receives the state signal $D_W$ and the clock signal CK and generates the switching signal $S_W$ in accordance with the logic operation result between the state signal $D_W$ and the clock signal CK. In accordance with the logic operation, the pulse width of the switching signal $S_W$ is determined by the pulse width of the clock signal CK.

Figure 3:
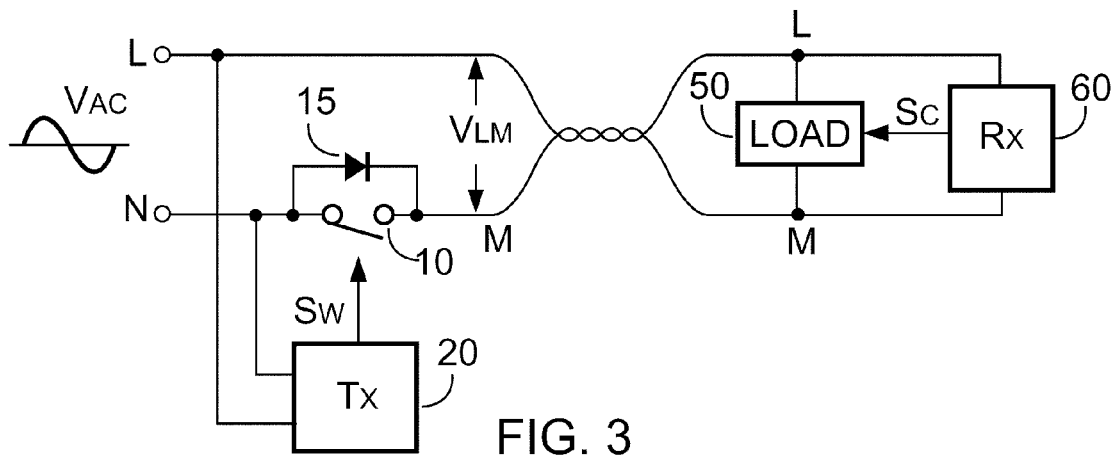
FIG. 3 shows an exemplary embodiment of a power management interface for a load.

Referring to FIGS. 3 and 6, when the switching signal $S_W$ is not asserted (that is the switching signal $S_W$ is at a high level), the switch 10 is turned on. At this time, the voltage on the AC power line $V_{AC}$ is provided to the load 50, and the waveform of the power line signal $V_{LM}$ tracks the waveform of the voltage on the AC power line $V_{AC}$. When the switching signal $S_W$ is asserted (that is the switching signal $S_W$ is at a low level), the switch 10 is turned off. At this time, the power line signal $V_{LM}$ is turned off and at a zero level. Thus, the period $T_D$ when the power line signal $V_{LM}$ is at the zero level is determined by the asserted pulse width of the switching signal $S_W$, in other words, the turned-on angle of the power line signal $V_{LM}$ is determined by the asserted pulse width of the switching signal $S_W$. Thus, the phase modulation to the power line signal $V_{LM}$ is achieved for managing the power of the load 50.

Referring to FIG. 5, the pulse generator 30 comprises a current source 31, a capacitor 32, a comparator 33, an inverter 35, a NMOS transistor 36, and an AND gate 39. The capacitor 32 is coupled between a drain of the NMOS transistor 36 and a ground. The current source 31 is coupled between a voltage source $V_{CC}$ and the drain of the NMOS transistor 36 for charging the capacitor 32. A gate of the NMOS transistor 36 receives the zero-crossing signal $S_V$ through the inverter 35 and a source thereof is coupled to the ground. The NMOS transistor 36 is controlled by the inverse signal of the zero-crossing signal $S_V$ for discharging the capacitor 32. A negative input terminal of the comparator 33 is coupled to the drain of the NMOS transistor 36, and a positive input terminal thereof receives a reference signal $V_{T1}$. The comparator 33 compares the voltage at the drain of the NMOS transistor 36 with reference signal $V_{T1}$ and generates a comparison signal $V_{C1}$ according to the comparison result. The zero-crossing signal $S_V$ is further provided to an input of the AND gate 39. Another input of the AND gate 39 receives the comparison signal $V_{C1}$. The AND gate 39 generates the clock signal CK according to the in accordance with the logic operation result between zero-crossing signal $S_V$ and the comparison signal $V_{C1}$.

In the pulse generator 30 of FIG. 5, the pulse width of the clock signal CK is determined according to the values of the current source 31, the capacitor 32, and the reference signal $V_{T1}$. Thus, the pulse width of the clock signal CK varies with the adjustment of values of the current source 31, the capacitor 32, and the reference signal $V_T$. The pulse width of the clock signal CK further affects the asserted pulse width of the switching signal $S_W$ and the turned-on angle of the power line signal $V_{LM}$.

Figure 7:
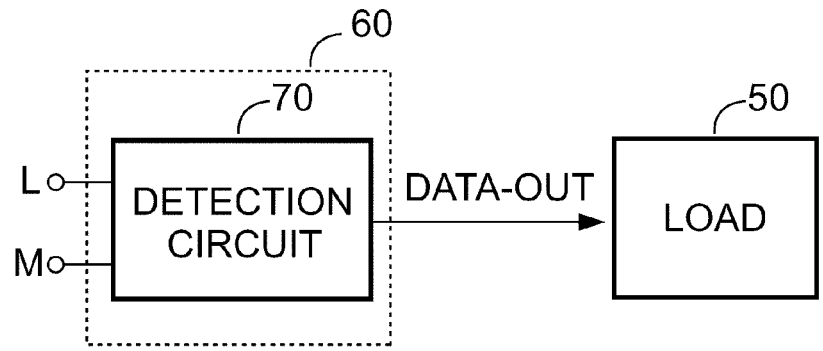
FIG. 7 shows an exemplary embodiment of the receiving circuit in FIG. 3.

FIG. 7 shows an exemplary embodiment of the receiving circuit 60 in FIG. 3. The receiving circuit 60 comprises a detection circuit 70 which detects the modulated phase of the power line signal $V_{LM}$ and generates the receiving-data DATA_OUT according to the modulated phase of the power line signal $V_{LM}$. Thus, during the power management, the power of the load 50 is adjusted according to the receiving-data DATA_OUT.

Figure 8:
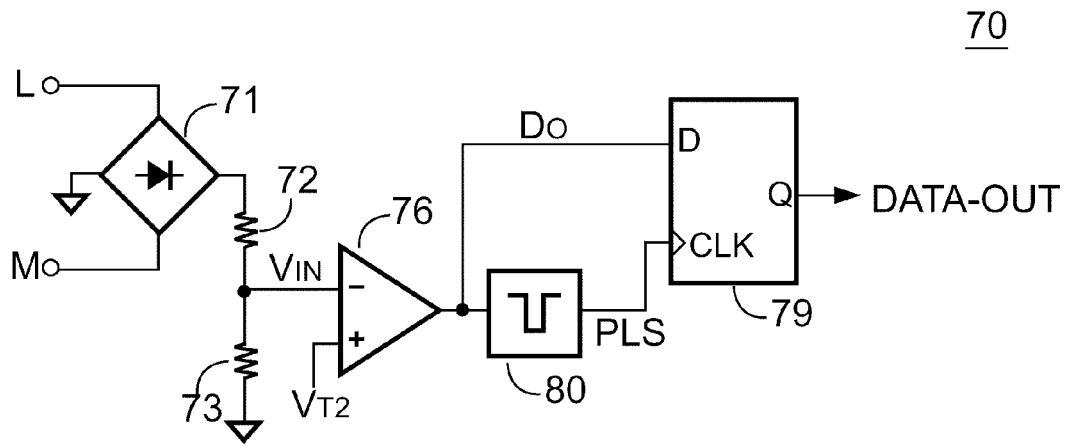
FIG. 8 shows an exemplary embodiment of the detection circuit in FIG. 7.

FIG. 8 shows an exemplary embodiment of the detection circuit 70 in FIG. 7. Referring to FIG. 8, the detection circuit 70 comprises a rectifier 71, an attenuator developed by resistors 72 and 73, a comparator 76, a pulse generator 80, and a D flip-flop 79. The rectifier 71 receives the power line signal $V_{LM}$ and transforms the power line signal $V_{LM}$ to a direct current (DC) signal. The voltage of the DC signal is divided by the resistors 72 and 73, and an attenuated signal $V_{IN}$ is thus generated, as shown in FIG. 6. A negative input terminal of the comparator 76 receives the attenuated signal $V_{IN}$, and a positive input terminal thereof receives a reference signal $V_{T2}$. Referring to FIGS. 6 and 8, the comparator 76 compares the attenuated signal $V_{IN}$ with the reference signal $V_{T2}$ and generates a data signal $D_O$ according to the comparison result. The data signal $D_O$ is generated in response to the turned-on angle of the power line signal $V_{LM}$. The pulse generator 80 receives the data signal $D_O$ and generates a pulse signal PLS in accordance with the data signal $D_O$. Referring to FIG. 6, the pulse signal PLS indicates the available of the data signal $D_O$. The D flip-flop 79 receives the pulse signal PLS and samples the data signal $D_O$ in accordance with raising edge of the pulse signal PLS to generate the receiving-data DATA_OUT. Referring to FIG. 6, in the embodiment, the receiving-data DATA-OUT sampled by the D flip-flop 79 is a digital signal "101".

Thus, in the embodiment of the power management interface, the power delivered to the load 50 is controlled by the transmitting-data DATA-IN. The transmitting circuit 20 modulates the phase of the power line signal $V_{LM}$ according to the digital transmitting-data DATA-IN. Then, the receiving circuit 60 demodulates the transmitting data DATA-IN in accordance with the modulated phase of the power line signal $V_{LM}$ to obtain the digital receiving-data DATA-OUT. The receiving-data DATA-OUT is thus correlated to the transmitting-data DATA-IN. The power of the load 50 is managed according to the receiving-data DATA-OUT.

According to the embodiment, the phase modulation of the power line signal $V_{LM}$ is performed only when the power of the load 50 is desired to be managed. Thus, in the normal condition, the switch 10 remains the turned-on state, and the phase of the power line signal $V_{LM}$ is not modulated, resulting in a good power factor and low current harmonic for the AC power line $V_{AC}$. Moreover, since the power management interface uses the digital transmitting-data DATA-IN and the digital receiving-data DATA-OUT to manage the power of the load 50 because of digital control, the power management interface can be applied in various types of loads, such as a resistance load, a capacitance load. A plurality of functions or commands can be applied to the load in a way of the digital sequence of the invention, such as fan speed of ceiling fan, address data of the loads, illumination of lights, etc, and a plurality of loads can be controlled by one power management interface.

Figure 9:
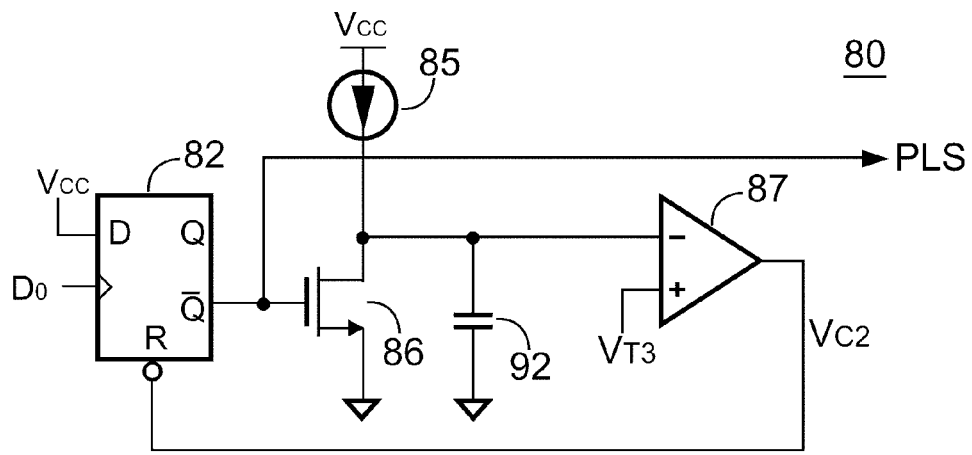
FIG. 9 shows an exemplary embodiment of the pulse generator in FIG. 8.

FIG. 9 shows an embodiment of the pulse generator 80. Referring to FIG. 9, the pulse generator 80 comprises a D flip-flop 82, a current source 85, a NMOS transistor 86, a comparator 87, and a capacitor 92. The D flip-flop 82 receives a voltage signal from the voltage source $V_{CC}$ and samples the voltage signal in accordance with raising edge of the data signal $D_O$ to generate the pulse signal PLS at an inverse output terminal $\overline{Q}$ of the D flip-flop 82. The capacitor 92 is coupled between a drain of the NMOS transistor 90 and the ground. The current source 85 is coupled between the voltage source $V_{CC}$ and the drain of the NMOS transistor 86 for charging the capacitor 92. A gate of the NMOS transistor 86 is coupled to the inverse output terminal $\overline{Q}$ of the D flip-flop 82 and a source thereof is coupled to the ground. The NMOS transistor 86 is used to discharge the capacitor 92. A negative input terminal of the comparator 87 is coupled to the drain of the NMOS transistor 86, and a positive input terminal thereof receives a reference signal $V_{T3}$. The comparator 87 compares the voltage at the drain of the NMOS transistor 86 with reference signal $V_{T3}$ and generates a comparison signal $V_{C2}$ according to the comparison result. The comparison signal $V_{C2}$ is provided a reset terminal R of the D flip-flop 82 for resetting the D flip-flop 82.

Figure 10:
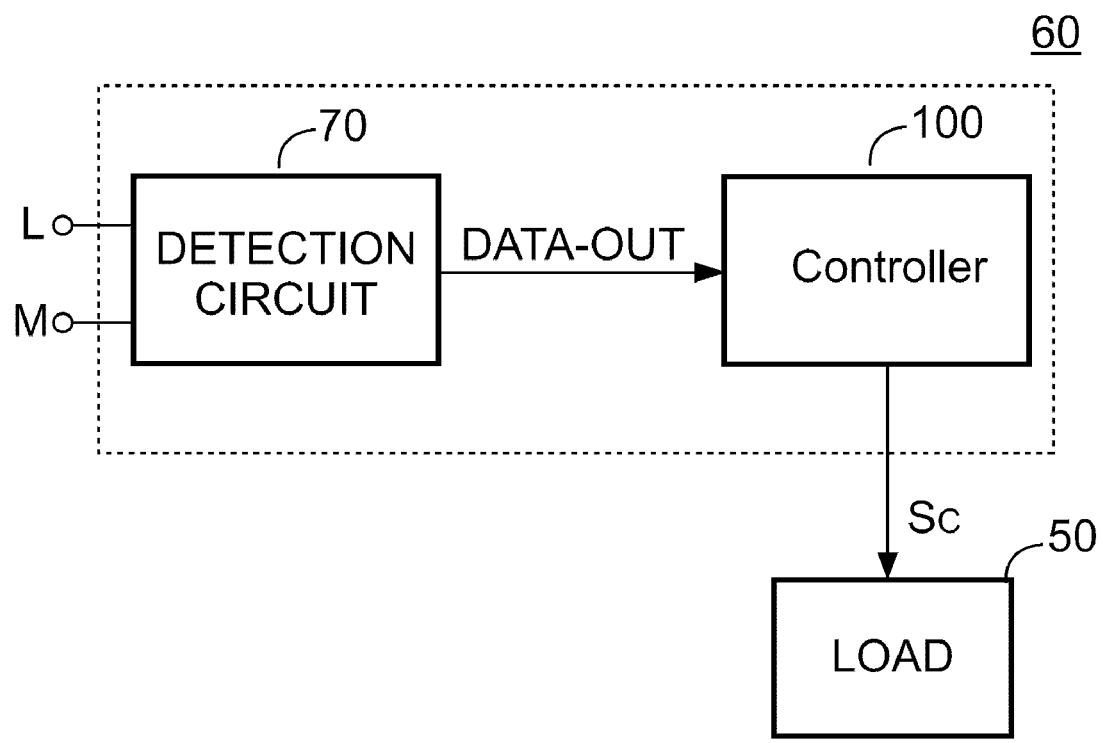
FIG. 10 shows another exemplary embodiment of the receiving circuit in FIG. 3.

In the embodiment of FIG. 7, the detection circuit 70 of the receiving circuit 60 generates the digital receiving-data DATA-OUT to the load 50. A conversion circuit of the load 50 may converse the digital receiving-data DATA-OUT to an analog signal for managing the power. In some embodiments, as shown in FIG. 10, the receiving circuit 60 comprises the detection circuit 70 and a control circuit 100. The detection circuit 70 generates the receiving-data DATA_OUT according to the modulated phase of the power line signal $V_{LM}$. The control circuit 100, which is implemented by a digital-analog converter in this embodiment, converse the digital receiving-data DATA-OUT to an analog control signal $S_C$. The load 50 receives the control signal $S_C$, and then the power of the load 50 is managed in accordance with the control signal $S_C$ derived from the digital receiving-data DATA-OUT.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power management interface comprising:
    a switch coupled to an AC power line for controlling a power line signal to a load;
    a transmitting circuit generating a switching signal to control the switch and achieve a phase modulation to the power line signal in response to a transmitting-data; and
    a receiving circuit coupled to receive the power line signal for detecting a phase of the power line signal and generating a receiving-data to control power of the load;
    wherein the receiving-data is generated in accordance with the phase detection of the power line signal and correlated to the transmitting-data, and
    wherein the transmitting circuit comprises:
        an input circuit coupled to the AC power line for generating a clock signal;
        a register memorizing a state of the transmitting-data for generating a state signal; and
        an output circuit generating the switching signal coupled to control the switch in response to the state signal and the clock signal.

2. The power management interface as claimed in claim 1, wherein the input circuit comprises:
    a voltage divider coupled to the AC power line to generate an input signal;
    a comparator generating a zero-crossing signal by comparing the input signal with a reference signal; and
    a pulse generator generating the clock signal in response to the zero-crossing signal;
    wherein the clock signal is coupled to the register.

3. The power management interface as claimed in claim 1, wherein the receiving circuit comprises:
    a detection circuit coupled to receive the power line signal and detect the phase of the power line signal for generating the receiving-data;
    wherein the receiving-data is provided to the load.

4. The power management interface as claimed in claim 3, wherein the detection circuit comprising:
    a rectifier and an attenuator coupled to receive the power line signal for generating an attenuated signal;
    a comparator coupled to receive attenuated signal for generating a data signal in response to a turned-on angle of the power line signal;
    a pulse generator generating a pulse signal in response to the data signal, wherein the pulse signal indicates the available of the data signal; and
    a flip-flop receiving the pulse signal and the data signal and sampling the data signal according to the pulse signal for generating the receiving-data.

5. The power management interface as claimed in claim 1, wherein the receiving circuit comprises:
    a detection circuit coupled to receive the power line signal and detecting the phase of the power line signal for generating the receiving-data; and
    a control circuit generating a control signal according to the receiving-data;
    wherein the control signal is provided to the load.

6. The power management interface as claimed in claim 5, wherein the detection circuit comprises:
    a rectifier and an attenuator coupled to receive the power line signal for generating an attenuated signal;
    a comparator coupled to receive attenuated signal for generating a data signal in response to a turned-on angle of the power line signal;
    a pulse generator generating a pulse signal in response to the data signal, wherein the pulse signal indicates the available of the data signal;
    a flip-flop receiving the pulse signal and the data signal and sampling the data signal according to the pulse signal for generating the receiving-data.

7. The power management interface as claimed in claim 5, wherein the control circuit is implemented by adigital-analog converter.

8. The power management interface as claimed in claim 1, wherein the switch is a MOSFET or an IGBT.

9. A power management interface comprising:
    a switch coupled to an AC power line for controlling a power line signal to a load;
    a transmitting circuit generating a switching signal to control the switch and achieve a phase modulation to the power line signal in response to a transmitting-data; and a receiving circuit coupled to receive the power line signal for detecting a phase of the power line signal and generating a receiving-data to control power of the load;

wherein the receiving-data is generated in accordance with the phase detection of the power line signal and correlated to the transmitting-data, wherein the phase modulation is achieved by controlling a turn-on angle of the power line signal.

* * * * *